Figure 3A:
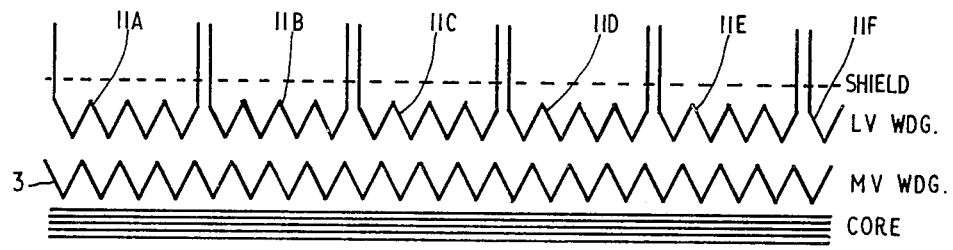

United States Patent [19]

Jansen

[11] 4,002,920
[45] Jan. 11, 1977

[54] UNDERGROUND ELECTRICAL RETICULATION SYSTEMS AND TRANSFORMERS THEREFOR

[76] Inventor: Hans Robert Jansen, 10/16 Prince St., Randwick, New South Wales 2031, Australia

[22] Filed: Dec. 20, 1974

[21] Appl. No.: 534,946

[30] Foreign Application Priority Data

Dec. 20, 1973 Australia .......................... 6070/73

[52] U.S. Cl. ............................. 307/17; 336/221; 336/223; 336/233
[51] Int. Cl.² ............................................ H02J 3/02
[58] Field of Search .......... 336/195, 233, 234, 223, 336/180, 175, 221; 174/108; 307/17, 42; 323/48

[56] References Cited

UNITED STATES PATENTS

| | | | |
|---|---|---|---|
| 2,385,983 | 10/1945 | Hanes | 336/223 X |
| 2,885,646 | 5/1959 | Bugg | 336/234 X |
| 2,888,654 | 5/1959 | Bugg | 336/234 X |
| 2,963,669 | 12/1960 | Salisbury | 336/223 X |
| 3,437,967 | 4/1969 | Josse | 336/175 X |
| 3,831,636 | 8/1974 | Bihner | 174/108 |

Primary Examiner—Thomas J. Kozma
Attorney, Agent, or Firm—Ladas, Parry, Von Gehr, Goldsmith & Deschamps

[57] ABSTRACT

A total underground residential electrical distribution system having a high voltage supply and low voltage distribution to residents connected to the system is characterized in that at least one of the transformers used in the system for stepping down the high voltage supply to the low voltages for distribution is constructed as a cable having a magnetic core, and has a high voltage primary winding extending substantially over the full length of the cable, and a number of low voltage secondary windings which together extend over substantially the full length of the cable.

2 Claims, 7 Drawing Figures

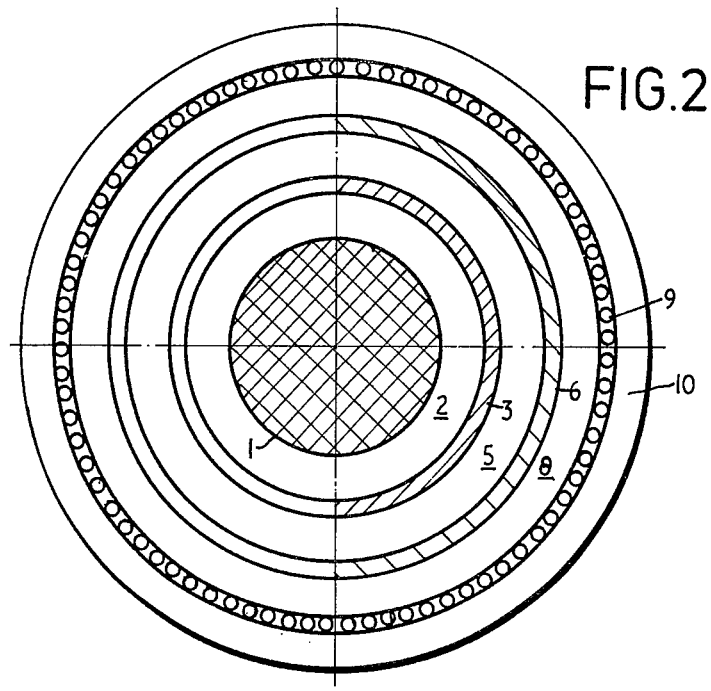
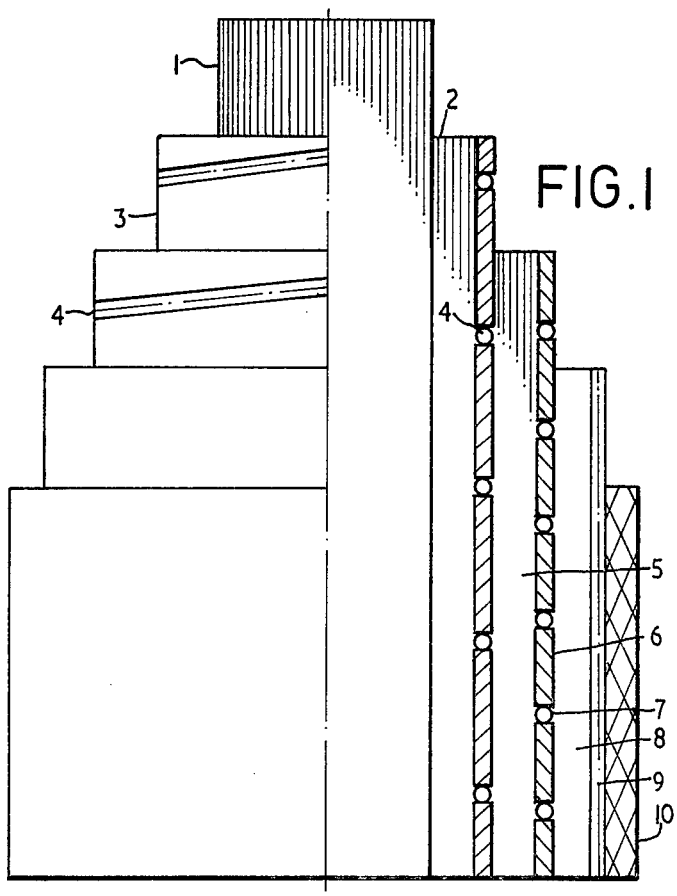

UNDERGROUND ELECTRICAL RETICULATION SYSTEMS AND TRANSFORMERS THEREFOR

This invention relates to underground reticulation systems and transformers therefor.

Because of the present day emphasis on a hygienic environment, and on high aesthetic standards for street furniture, users of electrical power are prepared to pay more for an underground electrical power supply than they would have been required to for overhead reticulation. This development is well established in new residential areas, and it is thought that very few new development areas will be serviced by overhead reticulation.

The pattern normally followed by local Councils is to leave all existing high voltage distribution networks on the overhead principle, but, after stepping down to a low voltage, reticulate in low-voltage underground cable networks. Pole-mounted transformers for stepping down the high voltage are gradually being replaced by miniature sub-stations or so-called padmounts. These house, as well as the transformer, a large variety of protection and sectionalising equipment. These transformer stations are still surface mounted.

In a number of countries, and particularly in the United States of America, the trend is now toward total underground residential distribution, in which surface mounted electrical equipment is replaced by sub-surface equipment. However, total underground distribution does give rise to problems of which the more prominent ones are:

1. Heat dissipation from the transformers, and
2. Corrosion of buried equipment, which is intensified by thermo-cycling.

The present invention provides an alternative total underground residential distribution system in which the heat distribution problem is solved, and transformers for use in the system. Each transformer for the system is constructed as a cable, servicing a predetermined number of residences, so that the heat is dissipated over the entire length of the cable.

Therefore a total underground residential electrical distribution system is characterised in that at least one of the transformers used in the system for stepping down the high voltage supply to a low voltage is constructed as a cable having a magnetic core, and a high voltage primary winding and low voltage secondary windings extending over substantially the full length of the cable.

The invention also comprises a transformer for use in a total underground electrical distribution core in the form of a cable comprising a magnetic core, a primary high voltage winding extending over substantially the whole length of the cable, and a plurality of secondary low voltage windings also extending over substantially the whole length of the cable.

Figure 3B:
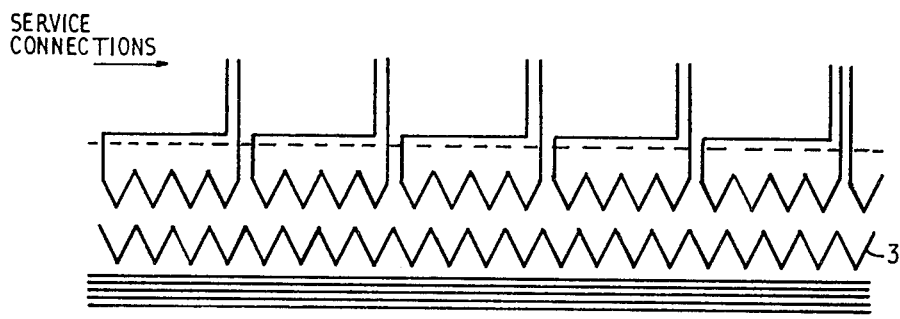
Figure 3C:
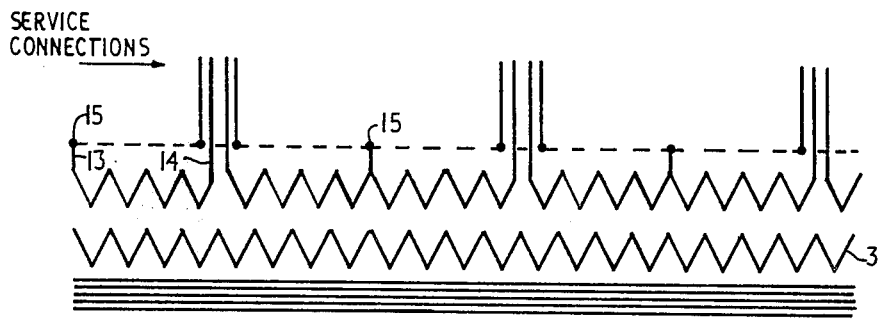
Figure 4:
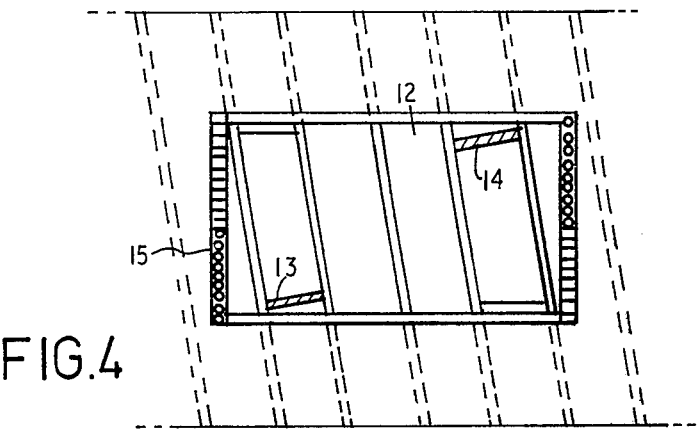
Figure 5:
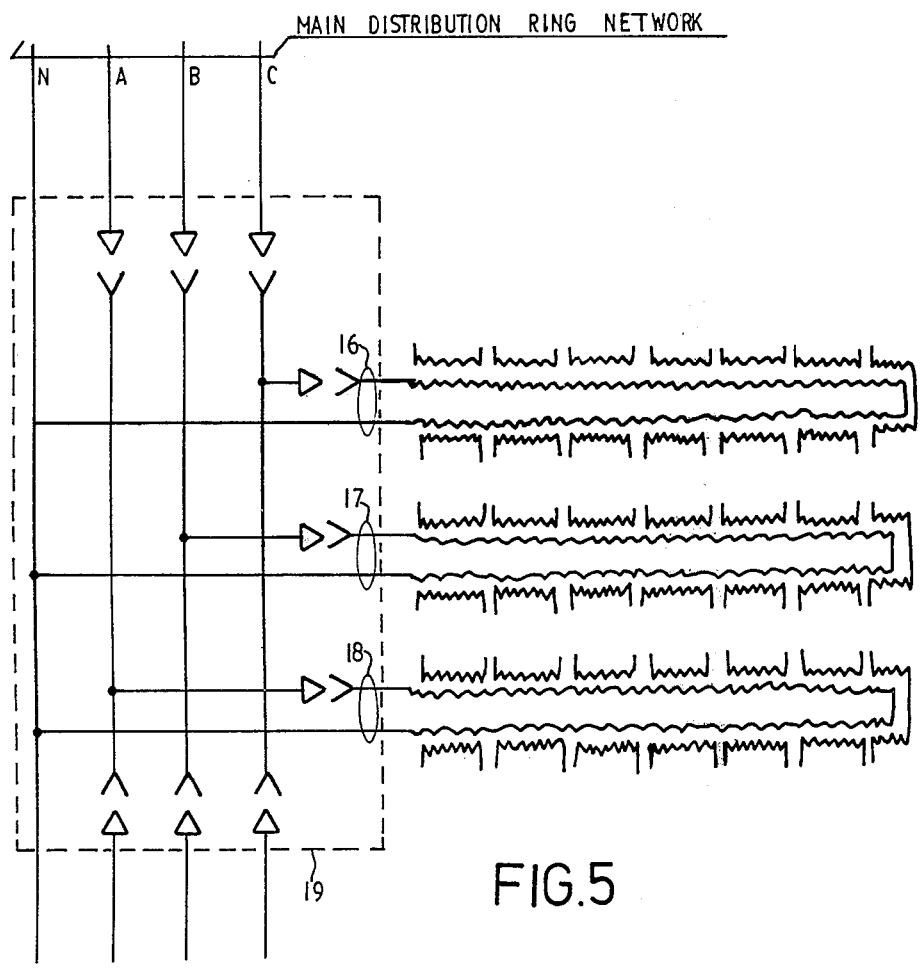

Reference will now be made to the accompanying drawings, in which:

FIG. 1 is a drawing of a short length of a cable-transformer according to this invention partly in section, FIG. 2 is an end view of the cable of FIG. 1, FIGS. 3A, 3B and 3C are schematic diagrams of a cable with the low voltage winding interrupted to provide low voltage outputs for separate dwellings, FIG. 4 shows a portion of the cable at an interruption, and FIG. 5 is a circuit diagram of three cable-transformers connected in three-phase star connection to the high voltage supply at a T-junction.

The cable-transformer of FIGS. 1 and 2 has a magnetic core 1 which may be only a few square centimeters in cross-section but is very long and flexible. Since the magnetic core is small in section, the induced voltage will be low, and a relatively large number of turns is required, which are spread over a long distance. The high voltage and low voltge windings are arranged concentrically around the core. The whole construction of the cable is such that the cable is sufficiently flexible to permit drum coiling and trench laying.

Soft magnetic silicon steels, either hot- or cold-reduced, can be used for the core. A low-loss cold reduced oriented silicon steel, having a high degree of preferential crystallographic orientation, is preferred. The core is preferably made of a bundle of wires. The wires need to be insulated from each other, and this can be achieved by one of the known surface treatments as used on cold rolled strip. However, the core could also be made of strip, a magnetic powder-insulation mixture, or a paste.

Surrounding the core is the high voltage insulation layer 2. Various materials may be used for this layer. However, oil impregnated paper is satisfactory and, if used, then the core should be provided with a thin coat of an oil resistant insulation material such as polyvinyl chloride - this coating serves to seal the core and prevent oil drainage from the paper to the core.

The high voltage winding 3 is of metal strip, such as copper or aluminum, and extends the full length of the cable. It is concentric with the core, and the uninsulated strip is applied in much the same way as the paper lapping in the layer 2, but with no overlap, so that a small gap is left between the turns, which is filled with the inter-turn insulation 4. This insulation does not have to stand any great stress. If the insulation between the core and the high voltage winding is PVC then the separate inter-turn insulation can be omitted, the strip 3 being then embedded in the underlying main insulation.

Surrounding the high voltage winding is the insulation 5 between it and the low voltage windings. If oil impregnated paper is used a sealing coat for the winding 3 is necessary. The low voltage winding is also wound from rectangular strip 6. Normally the strip will vary from that of the high voltage winding in shape and size, and the number of turns per meter will differ from that of the primary. Inter-turn insulation 7 is provided.

Surrounding the low voltage winding is an insulating layer 8 of a suitable synthetic plastic material such as PVC. This is surrounded by a steel wire armouring or shield 9 to give the cable mechanical protection. Tinned or otherwise plated steel wire is applied in much the same way as for armoured cables. This wire shield must be interrupted in at least one place, to avoid shorted turns.

The final or outer layer 10 is a bitumen impregnated fibre bedding or equivalent material.

FIGS. 3A, 3B and 3C show the equivalent circuit diagrams of the cable after the outer layers of the cable have been pierced as shown in FIG. 4 and the low voltage winding interrupted to provide, say a number of separate secondaries 11A, 11B, etc., each giving say, 240 volts output. For each low voltage service connection a T off is made at regular intervals. The low voltage winding is designed so that the average front footage of each block is the length of cable required to give the desired service voltage, say 240 volts. At each block (or at least every second block) the outer layer 10, the shield 9 and outer insulation 8 are pierced as at 12 to expose the low voltage winding. The low voltage winding is cut and the cut ends are folded upwards as at 13, 14, and connections are made to these up-turned ends. The strands of the shield 9 may be so cut and folded up as at 15 that the tails can be used to make a crimped connection to one of the ends of each winding, giving the circuit arrangement of FIG. 3C.

When installing the cable-transformer in a supply system it is necessary to close the magnetic circuit to make the magnetic coupling most effective. To achieve this, both start and finish of the cable need to be brought together, as shown with each of the cables in the installation layout of FIG. 5.

This drawing shows a three-phase T-off in which the three cable-transformers 16, 17, 18 each have their ends brought into the junction box 19, and the ends are connected in star to the main underground grid N,A,B,C. As a result, the transformers are used in closed loops, in contrast to the so-called tree networks of the present underground reticulation system. Since start and finish are brought together, all components are readily accessible at the one point - all connecting, sectionalising and protective gear can be conveniently located at this point 19. No appreciable heat generation takes place at the point of connection.

The cable shown in FIGS. 1 and 2 is circular in cross-section and this is the most convenient shape for a single-phase cable according to the invention. Other cross-sections may be more suitable for multi-phase work. The magnetic resistance of the core of a cable-transformer according to the invention is high, and therefore the core may be short-circuited between two phases, thereby acting as a potential divider. The voltage drop per unit length is therefore the same as the voltage drop across the high voltage winding. The insulation between the core and the high voltage winding can then be made small.

The wire cross-section in the core is not critical within fairly wide limits.

A hard drawn aluminum conduit can replace the steel wire armouring shield.

The invention has the following advantages:

1. Underground reticulation is provided in which transformer and low voltage network coincide, and thus save a substantial amount of capital outlay. It can replace the resent line-pad-cable system and it provides every block with its own transformer.

2. The constructional concept is flexible, and as far as handling, transport, installation and maintenance are concerned, can be compared with an LV cable.

3. The heat generated is easily dissipated. The heat generation per unit of length is similar to that generated by cables.

4. As cable materials are used in the construction, undergrounding is no problem. Service experience with these materials spans a lifetime.

5. The close proximity of the LV terminals to the block to be served eliminates the need to over-rate the conductor cross-section. Voltage drop in the service connection is small.

6. The total losses in the system are reduced, and this reduces the annual capitalised cost of the system.

What I claim is:

1. An underground residential electrical distribution system comprising a high voltage source, a transformer constructed as a cable having a magnetic core, a high voltage multi-turn primary winding extending substantially over the full length of the cable, and a number of low voltage multiturn secondary windings which together extend over substantially the full length of the cable, the cable being laid underground for substantially its length adjacent the residences to be serviced and with the ends of the cable adjacent to complete the magnetic circuit, and the system also comprising connections from the high voltage source to the ends of the primary winding, and outlets to the residences outlets being connected to the ends of the secondary windings respectively.

2. An underground residential electrical distribution system as claimed in claim 1 wherein the secondary windings are wound as one continuous helix over the primary winding, insulation over the secondary winding, armouring over the insulation, the insulation and armouring being removed at areas where the secondary connections are to be made, the continuously wound secondary is cut at these areas, and the ends of the secondary windings are brought out at those areas.

* * * * *